United States Patent
Pate

[19]

[11] Patent Number: 5,933,975
[45] Date of Patent: Aug. 10, 1999

[54] ALIGNMENT TOOL AND CLAMPING MECHANISM FOR COLLECTING PLATES

[76] Inventor: Ray H. Pate, 1923 Chestnut Grove Rd., Knoxville, Tenn. 37923

[21] Appl. No.: 08/890,650

[22] Filed: Jul. 9, 1997

[51] Int. Cl.[6] ....................................................... G01B 5/25
[52] U.S. Cl. .............................................. 33/645; 33/533
[58] Field of Search ............................ 33/645, 533, 613, 33/562

[56] References Cited

U.S. PATENT DOCUMENTS

| | | |
|---|---|---|
| 617,123 | 1/1899 | Roberts . |
| 871,769 | 11/1907 | Anderson . |
| 2,440,701 | 5/1948 | Sharpe ...................................... 33/645 |
| 3,324,535 | 6/1967 | Johnson . |
| 3,785,030 | 1/1974 | Une et al. . |
| 4,583,278 | 4/1986 | Flores et al. . |
| 4,678,625 | 7/1987 | Wilson et al. . |
| 5,274,978 | 1/1994 | Perkonigg et al. . |
| 5,484,255 | 1/1996 | Lowell ................................... 414/789 |

*Primary Examiner*—Christopher W. Fulton
*Attorney, Agent, or Firm*—Diller, Ramik & Wight, PC

[57] ABSTRACT

An alignment tool is provided for aligning collecting plates of an electrostatic separator in substantially a common plane. The alignment tool includes a pair of elongated alignment members, at least one of which is of a convex configuration. The collecting plates, including any misaligned collecting plates, are sandwiched between the alignment members with the convex surface of one of the alignment members opposing the collecting plates. The convex member is then brought to a parallel position by forces applied to opposite ends thereof, and the alignment members are temporarily clamped in generally parallel relationship to each other which maintains the collecting plates aligned in a generally common plane. Thereafter, a rod of a permanent clamping mechanism having a plurality of loops is rested atop either of the alignment members and rotated to bring the loops into and through gaps between adjacent collecting plates. A second rod is passed through the loops and thereafter the alignment members are released and the clamping members retain the collecting plates in aligned relationship.

61 Claims, 7 Drawing Sheets

ALIGNMENT TOOL AND CLAMPING MECHANISM FOR COLLECTING PLATES

BACKGROUND OF THE INVENTION

Electrostatic separators are commonly used to separate particulates which are entrained in an air or gas stream. For example, in the power generation industry fossil fuel, such as bituminous coal, is pulverized, burned, water in a boiler generates steam, and the steam drives steam turbines which in turn drive generators to produce electricity. The ash resulting from the burnt fossil fuel is blown into electrostatic separators which may include a series of housings defining chambers in which electrostatic collecting plates are suspended and/or supported in so-called "fields" and "bays." Thousands of such collecting plates are located in a typical chamber and these collecting plates must be in precise parallel spaced relationship to each other with planes passing therethrough being generally parallel to the air flow through the chambers. As the particulate-entrained air passes between the collection plates, the particulate material is separated therefrom electrostatically in a conventional manner, drops to the bottom of the housing and is discharged through conventional hoppers with the clean air leaving the housing through an associated discharge opening for further treatment, should such be necessary, as might be dictated by emission criteria of state, municipal or federal agencies, such as the Environmental Protection Agency (EPA).

Typically, a single collecting plate ranges in height between approximately 40–48 feet and a typical width would be approximately 1¼ feet. Typically, each collecting plate might weigh between 173–207 pounds and normally such plates are roll formed and are easily bent and/or twisted. Thus, extreme care must be exercised at all times in handling the collecting plates, including during installation, maintenance, etc.

However, collecting plates are subject to normal distortion over time and the desired parallelism between adjacent collecting plates can lessen to a point at which one or more collecting plates can become extremely inefficient and/or inoperative. A typical collecting plate might over time develop undesired longitudinal camber, longitudinal bow, transverse twist, transverse bow, or the like. Longitudinal camber in a collecting plate of approximately 40–48 feet must be in the range of plus or minus 3/16". Longitudinal bow of a like dimensioned collecting plate must not exceed 1/16" in 3 feet of collecting plate length. The total transverse twist of the collecting plate must be no more than ¾", whereas the transverse bow must be between plus or minus ⅛". Thus, tolerances of collecting plates must be exactingly maintained over time to likewise maintain the efficiency of the associated electrostatic separation process. Heretofore, distorted, bent, twisted, etc. collecting plates had to be removed and replaced by new collecting plates or those found unacceptable tolerance-wise or might otherwise be inoperative were necessarily removed, repaired and replaced, all at appreciable costs, including, of course, downtime of the electrostatic separator or at least a portion thereof (bay and/or field) from which particular collecting plates are being repaired and/or replaced.

SUMMARY OF THE INVENTION

In keeping with the foregoing, the present invention is directed to a novel alignment tool which can be utilized to align any misaligned collecting plates of an electrostatic separator and, upon alignment thereof, a novel clamping mechanism is utilized to maintain the now-aligned collecting plates in proper spaced substantially parallel relationship relative to each other and to the direction of air flow therebetween in a typical electrostatic separator installation.

The novel alignment tool of the present invention includes a pair of alignment members which are relative long and can span a plurality of the collecting plates, at least one of which is misaligned, but all of which must be aligned with each other relative to a common plane which is also parallel to the direction of air flow through the electrostatic separator. At least one of the alignment members, but preferably both, are of a shallow convex curvature along the length thereof and the convex surfaces are positioned in opposing relationship to each other at opposite sides of a line of the collecting plates. Opposite ends of the alignment members are then forcefully brought together which brings the alignment members into parallel relationship to each other and inherently forces all of the collecting plates sandwiched therebetween, including any misaligned collecting plates, into aligned relationship to each other in a common plane. The elongated members of the alignment tool are then at least temporarily secured together incident to clamping the aligned collecting plates together. The clamping mechanism for clamping the aligned collecting plates together includes a pair of elongated clamping rods, one of which carries a series of loops with the loops being spaced from each other a distance slightly greater than the width of the collecting plates such that each loop can be positioned in a gap between adjacent collecting plates. Each loop projects through the gaps and a second clamping rod is slid through the loops thereby clampingly sandwiching the aligned collecting plates together after which the alignment tool can be removed and reused to repeat the process to align any other misaligned collecting plates requiring alignment.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
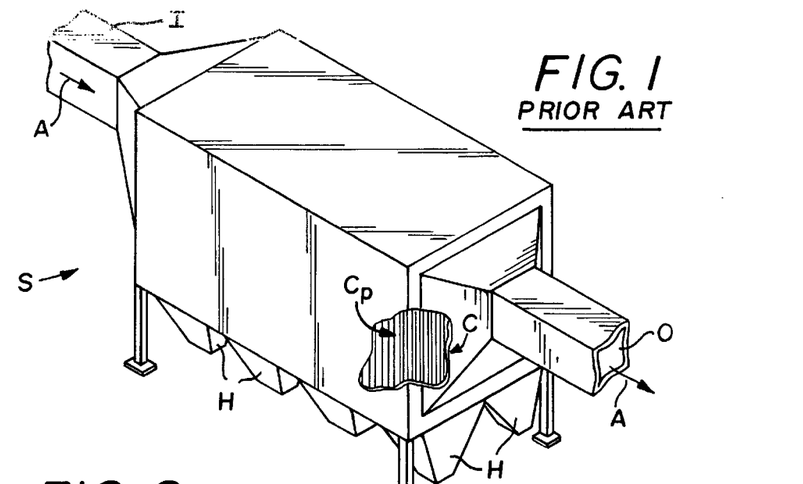
FIG. 1 is a perspective view of an electrostatic separator, and illustrates a housing defining a chamber in which a multiplicity of collecting plates are hung/supported and into which particulates entrained in air are fed incident to conventional electrostatic separation.
Figure 2:
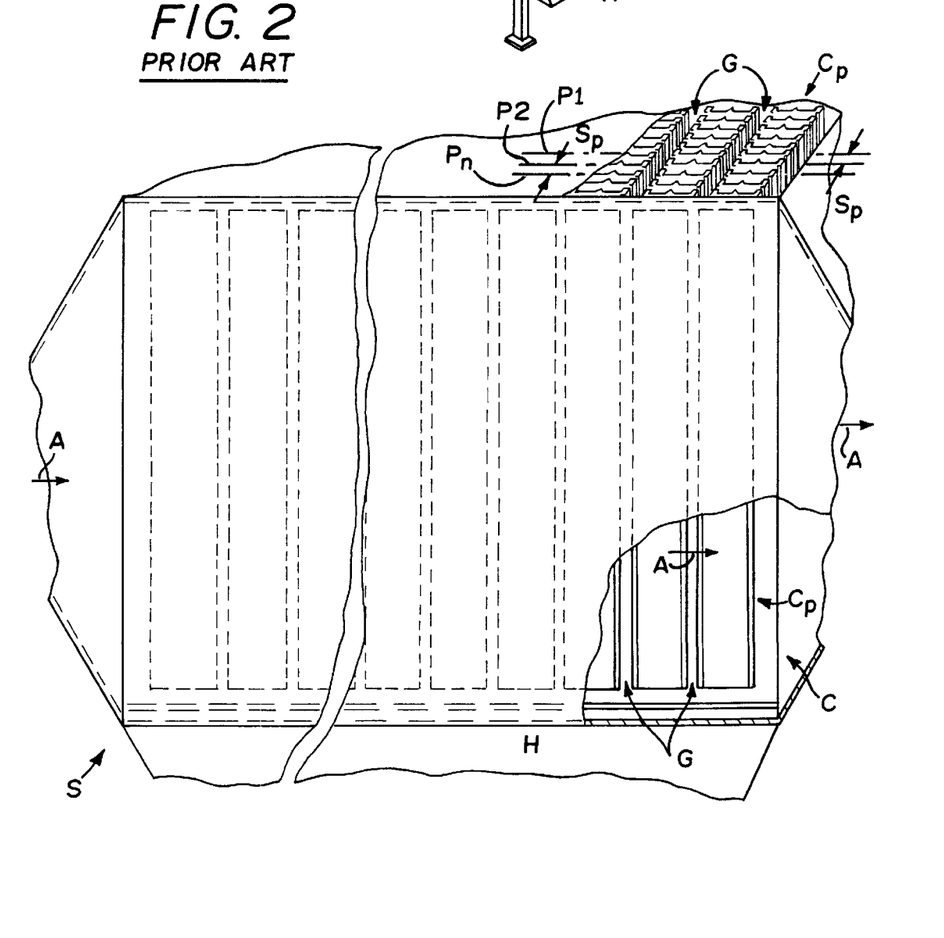
FIG. 2 is a fragmentary perspective view with parts broken away for clarity of the electrostatic separator of FIG. 1, and illustrates a plurality of collecting plates grouped in bays and fields with the collecting plates being disposed in spaced generally parallel planes and between which particulate entrained air flows from left-to-right.

A conventional electrostatic static separator S is illustrated in FIGS. 1 and 2 of the drawings and includes an inlet I and an outlet O through which flows a particulate/air admixture and relatively clean air, respectively. The electrostatic separator S includes a main housing defining an interior chamber C which might, for example, be subdivided into a plurality of conventional fields and bays in which are conventionally hung and/or supported conventional electrostatic collecting plates Cp which remove particulates from the air/particulate admixture in a conventional manner. These particulates are subsequently discharged through bottom hoppers H.

Figure 8:
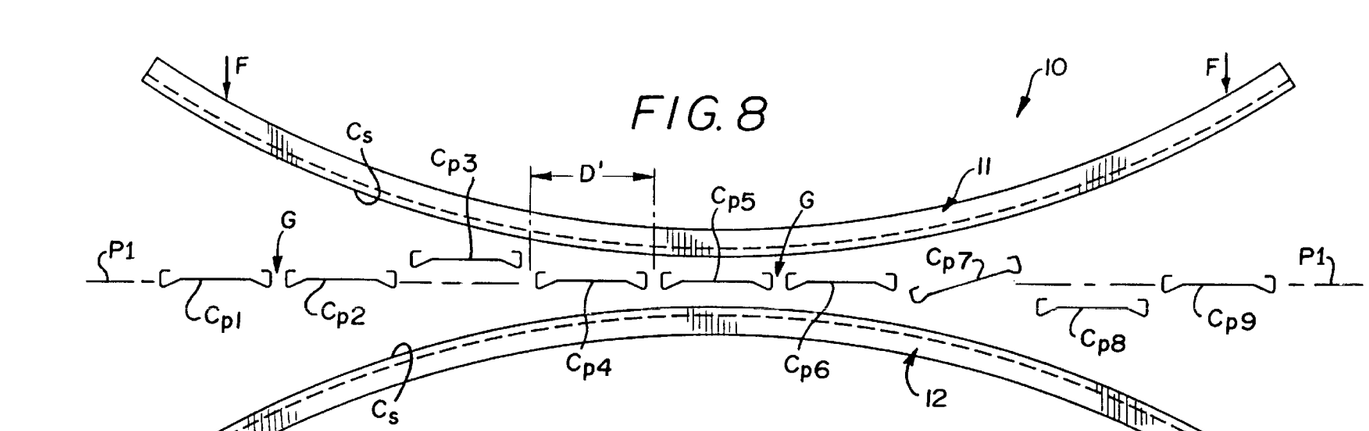
FIG. 8 is a schematic top plan view looking down in FIG. 2 at one of the rows of collecting plates which are illustrated as being misaligned, and illustrates the position of the elongated alignment members incident to the performance of an alignment procedure.

As is best illustrated in FIGS. 1 and 8 of the drawings, the collecting plates Cp are aligned in spaced relationship in substantially vertical planes, such as the planes P1, P2 shown in FIGS. 2 and 8 of the drawings. The collecting plates Cp and each plane P, P1, ... Pn or the like, are spaced from each other a predetermined distance to define therebetween a gap G (FIG. 8). The collecting plates Cp are individually identified in FIG. 8 by the reference characters Cp1 through Cp9. The collecting plates Cp1, Cp2, Cp4–Cp6 and Cp9 lie substantially in the plane P1, for example. However, the collecting plates Cp3 and Cp8 are misaligned, namely, each is out of the plane P1 because of longitudinal camber while the collecting plate Cp7 is transversely twisted. The misalignment of the collecting plates Cp3, Cp7 and Cp8 is unacceptable because of reduced efficiency and/or attendant shorting or grounding which can prevent electrostatic separation of the particulates from the air/particulate admixture. Therefore, it is highly desirable and virtually necessary that all of the collecting plates Cp in a particular plane P1 are substantially aligned and the latter assures that substantially identical spacing Sp (FIG. 2) is maintained between all collecting plates Cp in adjacent planes P1, P2, ... Pn through which air A passes in generally parallel relationship thereto from left-to-right in FIGS. 1 and 2 of the drawings.

Figures 3, 4:
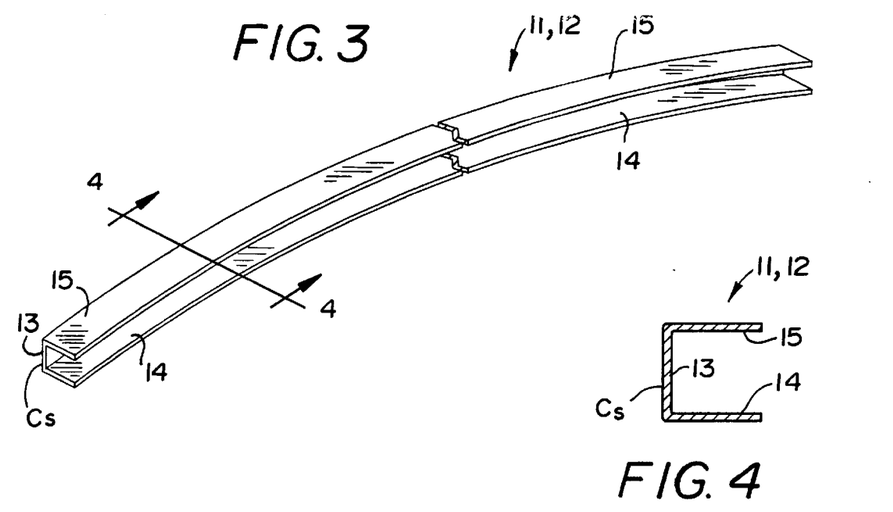
FIG. 3 is a fragmentary perspective view of one of a pair of elongated alignment members defining an alignment tool of the present invention, and illustrates the substantially convex curvature thereof.
FIG. 4 is an enlarged transverse cross-sectional view taken generally along line 4—4 of FIG. 3, and illustrates the generally C-shaped cross-sectional configuration of the alignment member.

A novel alignment tool for aligning the misaligned collecting plates Cp3, Cp7 and Cp8 in a group of collecting plates Cp (FIG. 8) is generally designated by the reference numeral 10 and includes a pair of substantially identical elongated alignment members 11, 12, each of which is of a generally C-shaped cross-sectional configuration, as is best illustrated in FIG. 4 of the drawings. Each of the elongated alignment members 11, 12 includes a vertical wall or bight wall 13, a lower generally horizontal wall 14 and an upper, generally horizontal wall 15 with the walls 14, 15 being in substantially parallel relationship to each other (FIG. 4). The bight wall or vertical wall 13 of each of the elongated alignment members 11, 12 includes an exterior generally convex surfaces Cs (FIGS. 3, 4 and 8). Each elongated alignment member 11, 12 is preferably constructed from relatively resilient metallic material, though each alignment member 11, 12 can be constructed from synthetic polymeric/copolymeric plastic material. The curvature of each of the elongated alignment members 11, 12 is exaggerated in FIG. 8 for purposes of description, and the actual curvature is far less shallow than that illustrated. The curvature of the alignment members 11, 12 must be sufficiently shallow to allow the same to be inserted in the spaces Sp between the collecting plates Cp in the adjacent planes P1, P2 . . . Pn, and once inserted on opposite sides of a plane P1 (FIG. 8) and the collecting plates Cp therein, the opposite ends (unnumbered) of the elongated alignment members 11, 12 are manually pushed toward each other by, for example, a person standing at each end thereof and applying oppositely directed forces, as is indicated by the force-indicating arrows F of FIG. 8. As the elongated alignment members 11, 12 are brought to their parallel position (FIG. 9), the convex surfaces Cs thereof bear against and eventually bring the misaligned collecting plates Cp3, Cp7 and Cp8 into planar alignment substantially with the remaining collecting plates and substantially in the plane P1, as is illustrated in FIG. 9 of the drawings.

Figures 9, 10, 11:
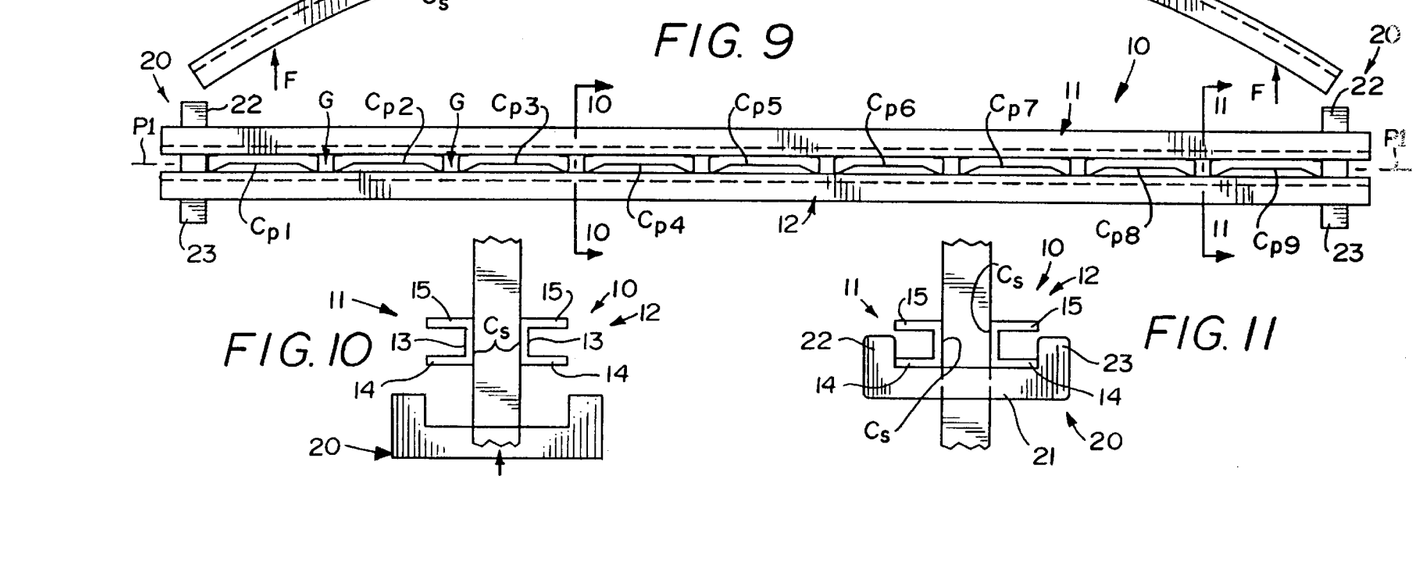
FIG. 9 is a top view, similar to FIG. 8, and illustrates the alignment members being brought into generally parallel relationship to each other which automatically aligns the misaligned collecting plates relative to each other and to other aligned collecting plates.
FIG. 10 is a cross-sectional view taken generally along line 10—10 of FIG. 9, and illustrates the alignment members in parallel relationship to each other and in abutting contact with opposite sides of all of the collecting plates for retaining the collecting plates in generally parallel relationship to each other and to a common plate.
FIG. 11 is a cross-sectional view similiar to FIG. 10 but taken along line 11—11 of FIG. 9, and illustrates a temporary holding clamp for temporarily holding the alignment members together relative to the aligned collecting plates.

Due to the inherent resilience of the elongated alignment members 11, 12, the same tend to rebound from the position shown in FIG. 9 to the position shown in FIG. 8 upon the release of the forces F. Accordingly, the parallel relationship of the alignment members 11, 12 shown in FIGS. 9 and 10 of the drawings must be retained incident to permanently clamping together the collecting members Cp in the aligned relationship shown in FIG. 9.

Figure 5:
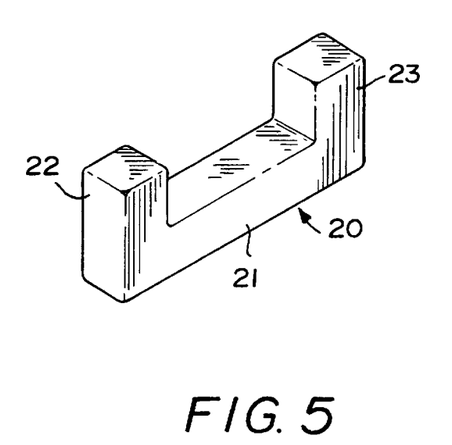
FIG. 5 is a perspective view of a temporary holding clamp which holds the alignment members of the alignment tool together in generally parallel relationship during the performance of a collecting plate alignment process, as is further illustrated in FIGS. 9 and 11 of the drawings.

As is best illustrated in FIGS. 5 and 11 of the drawings, temporary clamping means for clamping together the alignment members 11, 12 is generally designated by the reference numeral 20 which includes a generally shallow C-shaped clamping block of metal, wood, rubber, plastic or the like. The clamping block includes a bight portion 21 and a pair of generally parallel leg portions 22, 23 which are generally in spaced parallel relationship to each other. The leg portions 22, 23 are slipped or pushed upwardly from the phantom outline position shown in FIG. 10 to the solid line position shown in FIG. 11 during which time the forces F remain applied to the ends (unnumbered) of the alignment members 11, 12. However, when the forces F are released, the natural rebound characteristics of the resilient elongated alignment members 11, 12 bring the free edges (unnumbered) of the lower horizontal walls 14 of each of the alignment members 11, 12 into clamping engagement with the legs 22, 23, respectively (FIG. 11). In the position illustrated in FIGS. 9 and 11, all of the collecting plates Cp are temporarily held substantially in the plane P1 by the clamping means 20 and, of course, must be permanently held thus aligned upon the removal of the clamping means 20 from the alignment means 10.

Figure 6:
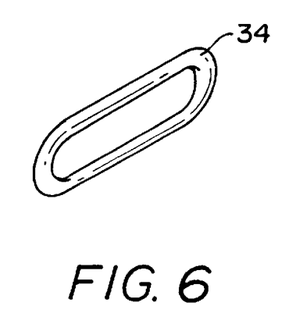
FIG. 6 is a perspective view of a loop or link, and illustrates the general configuration thereof prior to being welded to an elongated clamping rod (FIGS. 12 and 13) of a clamping mechanism.
Figures 12, 13:
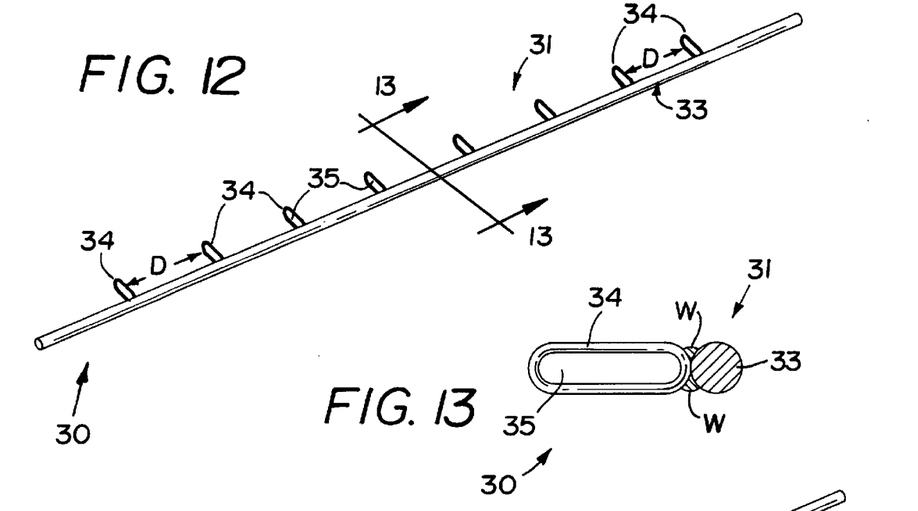
FIG. 12 is a perspective view of a first clamping rod or member of a clamping mechanism for permanently holding the aligned collecting plates in aligned relationship, and illustrates a plurality of loops projecting transversely from the first clamping rod.
FIG. 13 is an enlarged cross-sectional view taken generally along line 13—13 of FIG. 12, and illustrates the manner in which a plurality of the loops of FIG. 6 are individually welded along the length of the first clamping rod.
Figure 14:
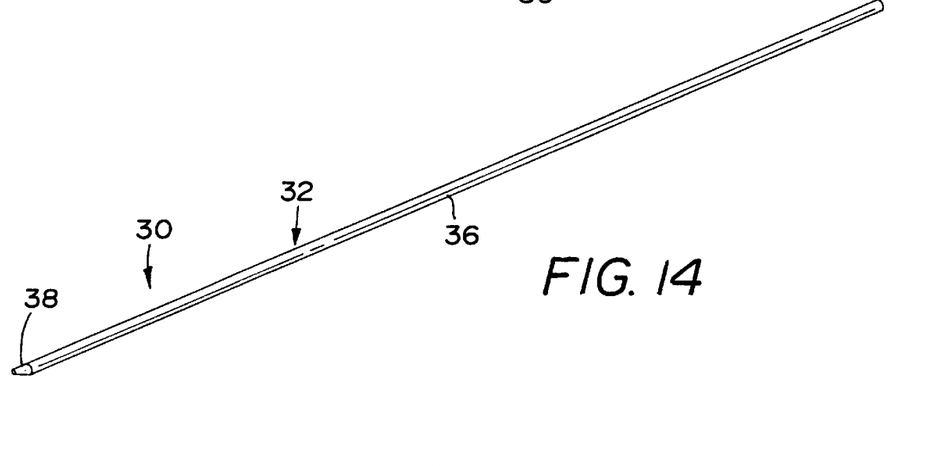
FIG. 14 is a perspective view of a second clamping rod or member of the clamping mechanism, and illustrates the second clamping rod having a tapered end.

In FIGS. 12 through 14 of the drawings is illustrated a clamping mechanism 30 for permanently clamping the collecting plates Cp in the aligned condition illustrated in FIGS. 9 and 10 of the drawings. The permanent clamping mechanism or means 30 includes a first clamping member 31 (FIGS. 12 and 13) and a second clamping member 32. The first clamping member 31 includes an elongated cylindrical clamping rod 33 formed of metallic material and having welded along its length a plurality of loops 34 each including an opening 35. The loops 34 are spaced from each other a distance D which corresponds essentially to the center-to-center distance D' (FIG. 8) between adjacent gaps G between the collecting plates Cp. Thus, each loop 34 can be presented in and passed through each of the gaps G. Preferably, each loop 34 is simply a link, as shown in FIG. 6, which can be welded by appropriate welds W (FIG. 13) to the clamping rod 33.

Figure 15:
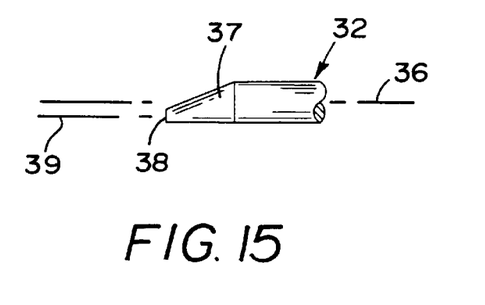
FIG. 15 is a fragmentary enlarged view of the tapered end of the second clamping rod of FIG. 14, and illustrates the tapered end having an offset axis relative to a central axis of the elongated second clamping rod.
Figure 16:
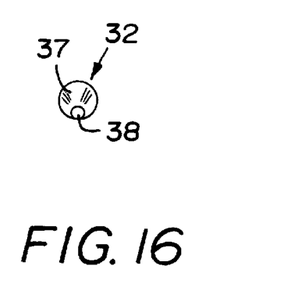
FIG. 16 is an end view looking from left-to-right in FIG. 15, and more clearly illustrates the offset tapered end.

The second clamping member or rod 32 is also constructed from metallic material, is generally a cylindrical rod, and includes a center axis 36 (FIG. 15). An end portion 37 of the rod 32 is tapered toward a terminal end 38 which is of a relatively small diameter and includes an offset axis 39 (FIG. 15) which is offset from but parallel to the center axis 36 of the rod 32. Thus, the tapered end 37 is itself offset or is non-concentric to the center axis 36 and when the clamping rod 32 is rotated about its center axis 36, the end 38 is displaced arcuately or orbitally about the center axis 36. Stated otherwise, when the clamping rod 32 is rotated, the axis 39 of the tapered end rotates about the center axis 36 to position the end 38 at any one of numerous different circumferential locations about the center axis 36, as viewed from left-to-right in FIG. 15. This allows the tapered end 37 to be more readily inserted through all of the openings 35 of the loops 34, as will be described more fully immediately hereinafter.

Figure 17:
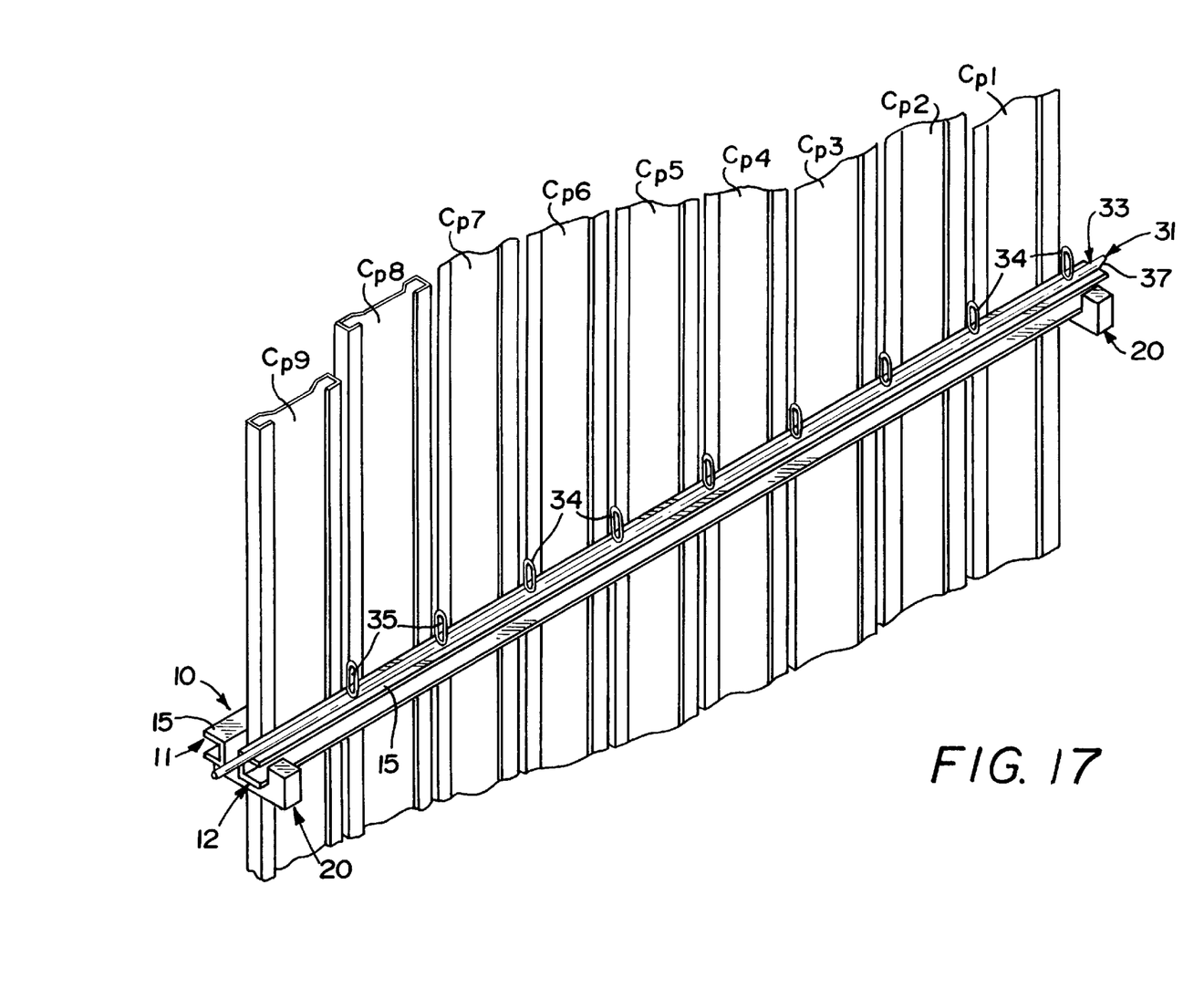
FIG. 17 is a perspective view of the alignment members of FIG. 9, and illustrates the manner in which the first clamping rod of FIG. 12 is positioned atop a horizontal wall of one of the elongated alignment members with each loop disposed vertically and aligned with an associated gap between adjacent aligned collector plates.
Figure 18:
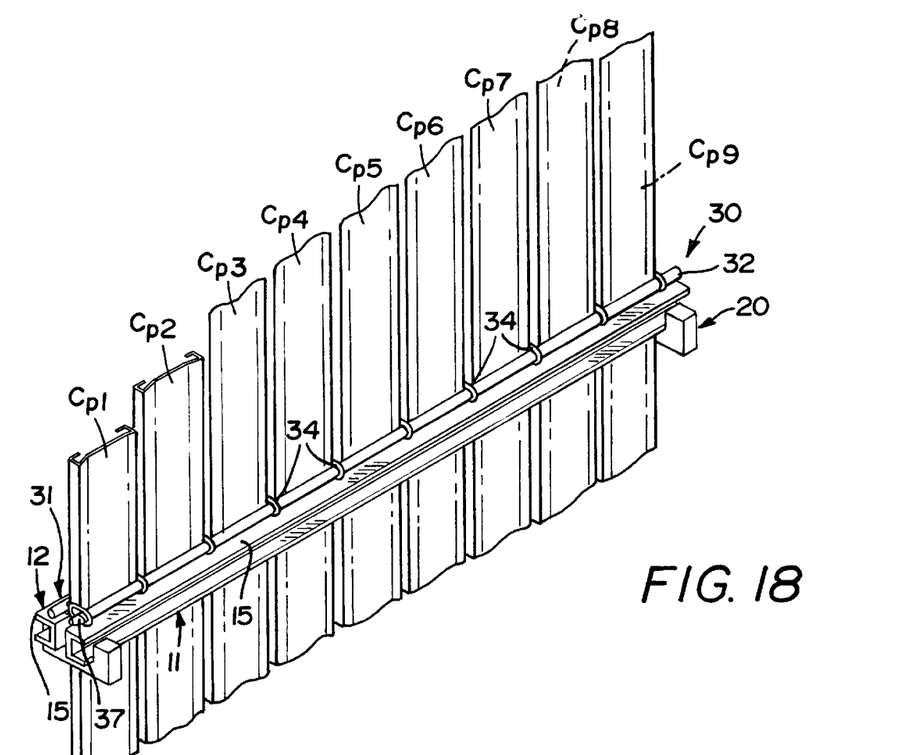
FIG. 18 is a perspective view similar to FIG. 17, but illustrates the opposite side of the collecting plates after the first rod has been pivoted approximately 90 degrees to project the loops through the gaps between the collecting plates and after the second clamping rod has been passed through the loops.
Figure 19:
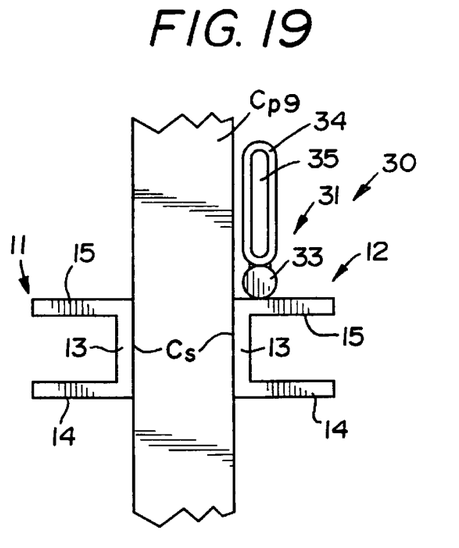
FIG. 19 is an enlarged fragmentary view looking from left-to-right in FIG. 17, and more clearly illustrates the position of the first clamping rod and its associated loops incident to being rotated through 90 degrees.
Figure 20:
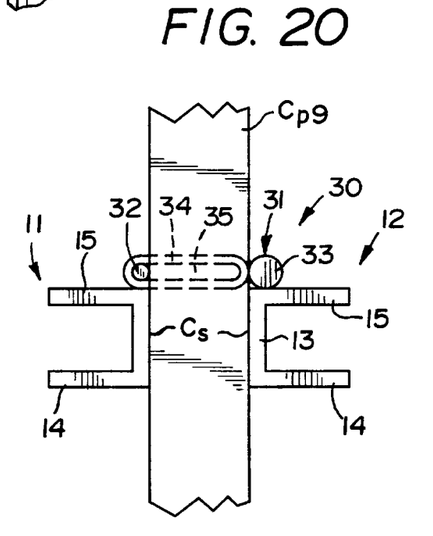
FIG. 20 is a perspective view looking from right-to-left in FIG. 18, and illustrates the clamped position of the two clamping rods.

In FIG. 17 of the drawings, the alignment mechanism 10 is shown temporarily clamped in place, as was heretofore described relative to FIG. 9. In this position, all of the collecting plates Cp are in alignment with each other and are generally substantially in the plane P1 (See FIG. 9). In order to maintain all of the collecting plates Cp in the plane P1 when thus aligned, the clamping rod 31 of the permanent clamping mechanism 30 is positioned atop either of the horizontal walls 15 of the elongated alignment members 11, 12 with the loops upright and aligned with the gaps G between the collecting plates Cp (FIGS. 17 and 19). The clamping rod 31 is then rotated from the position shown in FIGS. 17 and 19 to the position shown in FIGS. 18 and 20 at which time the loops 34 project through the gaps G and rest atop the horizontal wall 15 of the alignment member 11. The clamping rod 32 can now be inserted through all of the openings 35 of the loops 34 by inserting the same from right-to-left or left-to-right, as viewed in FIG. 18 until the position illustrated in FIG. 18 is achieved. During this insertion, the clamping rod 32 can be rotated which circumferentially displaces the nose or end wall 38 to facilitate its insertion in any one of the openings 35 of any one of the loops 34 which might be somewhat offset from or slightly misaligned relative to the others of the loops 34. However, by appropriately longitudinally sliding and rotating the clamping rod 32 in clockwise and/or counterclockwise directions, the clamping rod 32 can be inserted into the final clamping position shown in FIG. 18. Once the latter position is achieved, the temporary clamping blocks 20 are removed and the natural resiliency of the previously misaligned collecting plates (CP3, Cp7, Cp8) tending to return to their misaligned positions hold the permanent clamping means or mechanism 30 in the position shown in FIG. 18 which in turn retains all the collecting plates Cp aligned in the plane P1.

Figure 7:
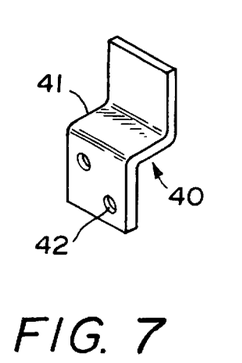
FIG. 7 is a perspective view of a bracket, and illustrates the particular configuration thereof which is secured to selected ones of the collecting plates to augment support of the clamping mechanism of FIGS. 12 through 14.
Figure 22:
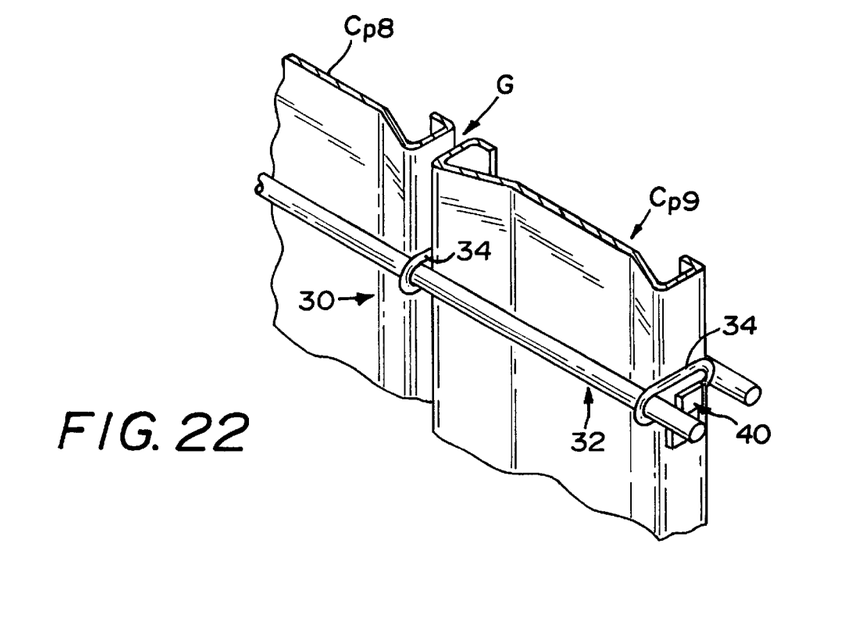
FIG. 22 is a perspective view of the last two of the clamping collecting plates illustrated in FIG. 1, and illustrates the bracket of FIG. 7 secured to a lateral edge of the last collecting plate and receiving in supporting relationship an endmost one of the loops.

If found necessary or desirable, a bracket 40 (FIGS. 7 and 22) having an offset ledge 41 and apertures 42 can be suitably secured by threaded bolts or screws passing through the apertures 42 into the endmost ones of the collecting plates Cp1 and Cp9 to support the clamping mechanism 30 by supporting the link 34 associated therewith, as is clearly evident in FIG. 22 of the drawings.

Figure 21:
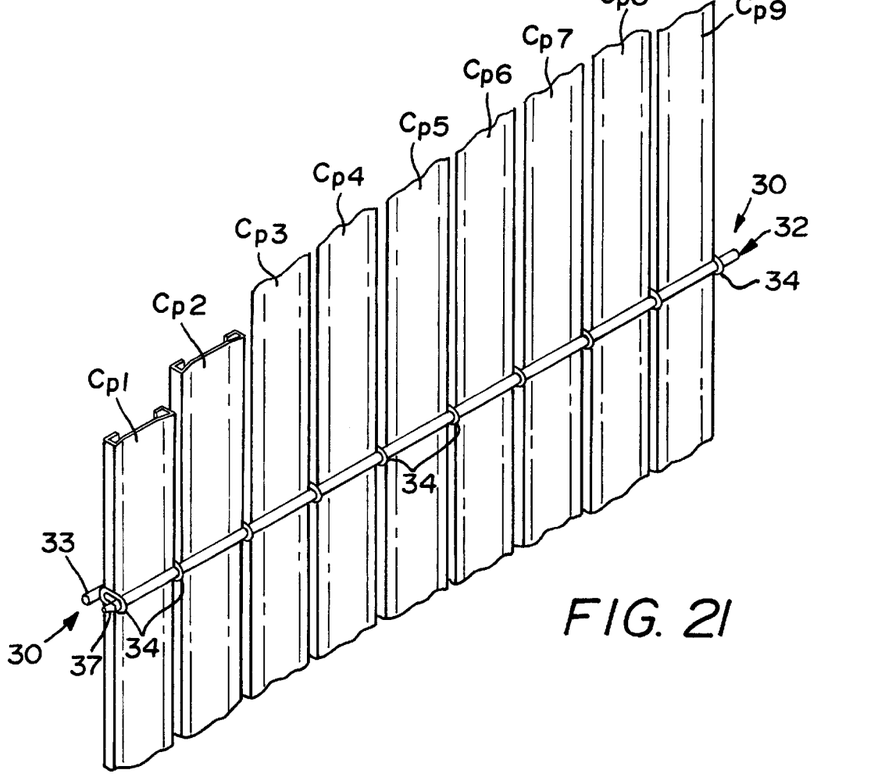
FIG. 21 is a perspective view similar to FIG. 18, and illustrates the alignment members removed from the now aligned and clamped collecting plates.

Though a single clamping mechanism 30 is shown in FIGS. 21 and 22, it is to be understood that more than one clamping mechanism 30 might necessarily be associated with each group of the collecting plates Cp. For example, the clamping mechanism 30 shown in FIG. 21 might be located substantially medially between opposite upper and lower ends (unnumbered) of the collecting plates Cp. However, if the misaligned collecting plates are severely misaligned, the clamping at the mid portions or medial portions thereof may not suffice to maintain the upper and lower ends of the misaligned collecting plates in aligned relationship.

Therefore, the alignment mechanism 10 can be utilized as was earlier described in conjunction with the upper and lower ends of the collecting plates Cp, and additional permanent clamping mechanisms, such as the clamping mechanism 30, can be utilized at the same upper and lower ends of the collecting plates Cp to thereby positively permanently clamp together with such permanent clamping mechanism 30 the upper ends (unnumbered) of the collecting plates Cp, the mid portions thereof, as shown in FIG. 21, and the lower end portions.

Although a preferred embodiment of the invention has been specifically illustrated and described herein, it is to be understood that minor variations may be made in the apparatus without departing from the spirit and scope of the invention, as defined the appended claims.

I claim:

1. An alignment tool comprising a pair of elongated alignment members, said pair of elongated members being adapted to be positioned on opposite sides of a plurality of elements of which at least one element is misaligned relative to the remainder of elements, said plurality of elements being adapted to be located in a substantially common plane, said pair of elongated members each having an elongated surface, said elongated surfaces being in spaced opposing relationship to each, other at least one of said members being flexible and curved along a longitudinal axis thereof to impart a convex curvature to said at least one member elongated surface, and said at least one member being adapted to be bent from its convex curvature into substantially parallel relationship to the other of said pair of members thereby effecting alignment of the at least one misaligned element with the remainder of elements.

2. The alignment tool as defined in claim 1 including means for retaining said pair of elongated members in said substantially parallel relationship.

3. The alignment tool as defined in claim 1 including first and second means for retaining said pair of elongated members in said substantially parallel relationship.

4. The alignment tool as defined in claim 1 including first and second means at opposite longitudinal end portions of said pair of elongated members for retaining said elongated members in said substantially parallel relationship.

5. The alignment tool as defined in claim 1 wherein said other of said pair of elongated alignment members is flexible and curved along a longitudinal axis thereof to impart a convex curvature to said other member elongated surface, and said other member being adapted to be bent from its convex curvature into substantially parallel relationship to said at least one member thereby effecting alignment of the at least one misaligned element with the remainder of elements.

6. The alignment tool as defined in claim 1 wherein said at least one elongated alignment member includes at least one substantially horizontally disposed surface and a substantially vertically disposed surface.

7. The alignment tool as defined in claim 1 wherein said at least one elongated alignment member includes at least one substantially horizontally disposed surface and a substantially vertically disposed surface, and said substantially vertically disposed surface and said at least one elongated alignment member elongated surface are one and the same surface.

8. The alignment tool as defined in claim 1 wherein said at least one elongated alignment member includes at least one substantially horizontally disposed wall and a substantially vertically disposed wall.

9. The alignment tool as defined in claim 1 wherein said at least one elongated alignment member includes at least one substantially horizontally disposed wall and a substantially vertically disposed wall, and said at least one elongated alignment member elongated surface is defined by said one member vertically disposed wall.

10. The alignment tool as defined in claim 1 wherein said at least one elongated alignment member is of a generally U-shaped transverse cross-sectional configuration defined by substantially parallel spaced upper and lower walls and a substantially vertical wall therebetween.

11. The alignment tool as defined in claim 1 wherein said at least one elongated alignment member is of a generally U-shaped transverse cross-sectional configuration defined by substantially parallel spaced upper and lower walls and a substantially vertical wall therebetween, and said at least one elongated alignment member elongated surface is defined by said one member vertical wall.

12. The alignment tool as defined in claim 1 comprising first and second means for clampingly securing therebetween in aligned relationship at least one of the remainder of aligned elements and the once misaligned element.

13. The alignment tool as defined in claim 1 comprising first and second means for clampingly securing therebetween in aligned relationship at least one of the remainder of aligned elements and the once misaligned element, and a first of said first clampingly securing means includes a portion spanning a gap between the last-mentioned two elements.

14. The alignment tool as defined in claim 1 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, and said second clampingly securing means spans said opening.

15. The alignment tool as defined in claim 1 comprising first and second clamping rods disposed on opposite sides of said elements in substantially parallel relationship to each other, said first clamping rod having at least one portion projecting through a gap between adjacent elements, said at least one portion having an opening, and said second clamping rod spans said opening.

16. The alignment tool as defined in claim 1 comprising first and second clamping rods disposed on opposite sides of said elements in substantially parallel relationship to each other, said first clamping rod having a plurality of longitudinally spaced portions with each portion projecting from said first clamping rod through a gap between adjacent elements, and said second clamping rod spans said openings.

17. The alignment tool as defined in claim 1 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, said second clampingly securing means spans said opening, said second clampingly securing means is an elongated rod having a tapered end, and said tapered end has an axis offset from said elongated rod axis.

18. The alignment tool as defined in claim 3 wherein said other of said pair of elongated alignment member is flexible and curved along a longitudinal axis thereof to impart a convex curvature to said other member elongated surface, and said other member being adapted to be bent from its convex curvature into substantially parallel relationship to said at least one member thereby effecting alignment of the at least one misaligned element with the remainder of elements.

19. The alignment tool as defined in claim 3 comprising first and second means for clampingly securing therebetween in aligned relationship at least one of the remainder of aligned elements and the once misaligned element.

20. The alignment tool as defined in claim 3 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, and said second clampingly securing means spans said opening.

21. The alignment tool as defined in claim 3 comprising first and second clamping rods disposed on opposite sides of said elements in substantially parallel relationship to each other, said first clamping rod having at least one portion projecting through a gap between adjacent elements, said at least one portion having an opening, and said second clamping rod spans said opening.

22. The alignment tool as defined in claim 3 comprising first and second clamping rods disposed on opposite sides of said elements in substantially parallel relationship to each other, said first clamping rod having a plurality of longitudinally spaced portions with each portion projecting from said first clamping rod through a gap between adjacent elements, and said second clamping rod spans said openings.

23. The alignment tool as defined in claim 3 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, said second clampingly securing means spans said opening, said second clampingly securing means is an elongated rod having a tapered end, and said tapered end has an axis offset from said elongated rod axis.

24. The alignment tool as defined in claim 18 comprising first and second means for clampingly securing therebetween in aligned relationship at least one of the remainder of aligned elements and the once misaligned element.

25. The alignment tool as defined in claim 18 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, and said second clampingly securing means spans said opening.

26. The alignment tool as defined in claim 18 comprising first and second clamping rods disposed on opposite sides of said elements in substantially parallel relationship to each other, said first clamping rod having at least one portion projecting through a gap between adjacent elements, said at least one portion having an opening, and said second clamping rod spans said opening.

27. The alignment tool as defined in claim 18 comprising first and second clamping rods disposed on opposite sides of said elements in substantially parallel relationship to each other, said first clamping rod having a plurality of longitudinally spaced portions with each portion projecting from said first clamping rod through a gap between adjacent elements, and said second clamping rod spans said openings.

28. The alignment tool as defined in claim 18 comprising first and second means for clampingly securing therebetween in aligned relationship at least one of the remainder of aligned elements and the once misaligned element, a first of said first clampingly securing means includes a portion spanning a gap between the last-mentioned two elements, an opening in said spanning portion, said second clampingly securing means spans said opening, said second clampingly securing means is an elongated rod having a tapered end, and said tapered end has an axis offset from said elongated rod axis.

29. The alignment tool as defined in claim 26 wherein said first and second clamping rods rest atop said at least one and other member.

30. A mechanism for holding a pair of spaced elements in a substantially common plane comprising first and second members located on opposite sides of a pair of spaced elements and in spanning relationship to a gap between the pair of spaced elements, a first of said members having a portion projecting through the gap between the pair of spaced elements, and a second of said members passing through an opening of said first member portion.

31. The mechanism as defined in claim 30 wherein said second member is a rod having a tapered end portion, and an axis of said tapered end portion is offset from a central axis of said rod to facilitate manual manipulative insertion of said tapered end portion into said opening.

32. The mechanism as defined in claim 30 wherein said first member is a rod.

33. The mechanism as defined in claim 30 wherein said first and second members are in substantially parallel relationship to each other.

34. The mechanism as defined in claim 30 wherein said first and second members are in substantially parallel relationship to each other and are substantially horizontally disposed.

35. The mechanism as defined in claim 31 wherein said first member is a rod.

36. The mechanism as defined in claim 31 wherein said first and second members are in substantially parallel relationship to each other.

37. The mechanism as defined in claim 31 wherein said first and second members are in substantially parallel relationship to each other and are substantially horizontally disposed.

38. A mechanism for holding a plurality of spaced elements in a substantially common plane comprising first and second members located on opposite sides of a pair of spaced elements and in spanning relationship to at least two gaps between the plurality of spaced elements, a first of said members having at least two portions with each portion projecting through an associated gap between the plurality of spaced elements, and a second of said members passing through an opening of each of said first member portions.

39. The mechanism as defined in claim 38 wherein said second member is a rod having a tapered end portion, and an axis of said tapered end portion is offset from a central axis of said rod to facilitate manual manipulative insertion of said tapered end portion into said openings.

40. The mechanism as defined in claim 38 wherein said first member is a rod.

41. The mechanism as defined in claim 38 wherein said first and second members are in substantially parallel relationship to each other.

42. The mechanism as defined in claim 41 wherein said first and second members are in substantially parallel relationship to each other.

43. A method of aligning a plurality of elements which are disposed in generally spaced juxtaposed relationship to each other comprising the steps of positioning a first elongated member along a first side of a plurality of spaced juxtaposed elements in spanning relationship to the elements and to gaps therebetween defined by spaced opposing edges of adjacent elements, positioning a second elongated member along a second side of the plurality of elements in spanning relationship thereto and to the gaps therebetween, and relatively moving the elongated members toward each other with sufficient force to move any misaligned elements of the plurality of elements into common substantially planar alignment with aligned elements of the plurality of elements.

44. The aligning method as defined in claim 43 wherein the force is applied initially at medial opposing portions of the elongated members and progressively radiates therefrom toward opposite end portions of the elongated members.

45. The aligning method as defined in claim 43 including the steps of constructing the first elongated member from flexible material curved along its length to define a convex surface, positioning the convex surface of the first elongated member in intimate opposing relationship to the first side of the plurality of elements, and performing the relatively moving step by deflecting the first elongated member from its curved configuration to a substantially straight configuration.

46. The aligning method as defined in claim 43 including the steps of constructing the first and second elongated member from flexible material curved along their length to each define a convex surface, positioning the first and second elongated member convex surfaces in intimate opposing relationship to the respective first and second sides of the plurality of elements, and performing the relatively moving step by deflecting the first and second elongated members from their curved configuration to a substantially straight configuration.

47. The aligning method as defined in claim 43 including the steps of constructing the first and second elongated member from flexible material curved along their length to each define a convex surface, positioning the first and second elongated member convex surfaces in intimate opposing relationship to the respective first and second sides of the plurality of elements, and performing the relatively moving step by deflecting the first and second elongated members from their curved configuration to a substantially straight configuration in substantial alignment with each other.

48. The aligning method as defined in claim 43 including the steps of constructing the first and second elongated member from flexible material curved along their length to each define a convex surface, positioning the first and second elongated member convex surfaces in intimate opposing relationship to the respective first and second sides of the plurality of elements, and performing the relatively moving step by deflecting the first and second elongated members from their curved configuration to a substantially straight configuration in substantial alignment and parallel relationship to each other.

49. The aligning method as defined in claim 43 including the steps of constructing the first and second elongated member from flexible material curved along their length to each define a convex surface, positioning the first and second elongated member convex surfaces in intimate opposing relationship to the respective first and second sides of the plurality of elements, and performing the relatively moving step by deflecting the first and second elongated members from their curved configuration to a substantially straight configuration in substantial alignment and parallel relationship to each other in a substantially horizontal plane.

50. The aligning method as defined in claim 43 including the step of at least temporarily holding the elongated members together after the performance of the moving step.

51. The aligning method as defined in claim 43 including the step of permanently holding the elongated elements in the aligned position.

52. The aligning method as defined in claim 43 including the step of at least temporarily holding the elongated members together after the performance of the moving step and thereafter permanently holding the elongated elements in the aligned position.

53. The aligning method as defined in claim 43 including the step of at least temporarily holding the elongated members together after the performance of the moving step thereafter permanently holding the elongated elements in the aligned position thereof, and discontinuing holding the elongated members together.

54. The aligning method as defined in claim 43 including the step of permanently holding the elongated elements in the aligned position thereof by spanning a plurality of the elongated members and gaps thereof with first and second clamping rods disposed in opposite sides of the elements in substantially parallel relationship to each other, and clamping the rods together through at least one of the gaps.

55. The aligning method as defined in claim 43 including the step of permanently holding the elongated elements in the aligned position thereof by spanning a plurality of the elongated members and gaps thereof with first and second clamping rods disposed in opposite sides of the elements in substantially parallel relationship to each other, and clamping the rods together through the gaps.

56. The aligning method as defined in claim 43 including the step of permanently holding the elongated elements in the aligned position thereof by spanning a plurality of the elongated members and gaps thereof with first and second clamping rods disposed in opposite sides of the elements in substantially parallel relationship to each other, and clamping the rods together through the gaps by threading the first clamping rod through openings in portions of the second clamping rod which first clamping rod portions project through the gaps.

57. The aligning method as defined in claim 53 including the step of discontinuing the temporary holding of the elongated members together after the elongated members have been permanently held together.

58. The method as defined in claim 43 wherein at least one misaligned element includes a plane traversing a plane through the aligned elements prior to the performance of the moving step, and the performance of the moving step moves the at least one misaligned element plane into substantially coplanar relationship to the aligned elements plane.

59. The aligning method as defined in claim 43 wherein at least one misaligned element is bowed relative to a longitudinal axis thereof whereby at least a portion of the misaligned element and a plane through the misaligned element portion is located outside a plane through the aligned elements prior to the performance of the moving step, and the performance of the moving step moves the misaligned element portion and the plane thereof into substantially coplanar relationship to the aligned elements and the aligned elements plane.

60. The aligning method as defined in claim 43 wherein at least one misaligned element is twisted relative to a longitudinal axis thereof whereby at least a portion of the misaligned element and a plane thereof is in nonparallel relationship to a plane through the aligned elements prior to the performance of the moving step, and the performance of the moving step moves the misaligned element portion and the plane thereof into substantially coplanar relationship to the aligned elements and the aligned elements plane.

61. The aligning method as defined in claim 43 wherein at least one misaligned element includes a portion located outside a plane through the aligned elements prior to the performance of the moving step, and the performance of the moving step moves the misaligned element portion into substantially coplanar relationship to the aligned elements plane.

* * * * *